(12) United States Patent
Hua

(10) Patent No.: US 6,916,437 B2
(45) Date of Patent: Jul. 12, 2005

(54) METHOD OF FABRICATING SHOE INSOLES

(76) Inventor: Kao Yu Hua, PMB#1008, 1867 Ygnacio Valley Rd., Walnut Creek, CA (US) 94598-3214

( * ) Notice: Subject to any disclaimer, the term of this patent is extended or adjusted under 35 U.S.C. 154(b) by 299 days.

(21) Appl. No.: 10/355,103

(22) Filed: Jan. 31, 2003

(65) Prior Publication Data
US 2004/0150136 A1 Aug. 5, 2004

(51) Int. Cl.⁷ .................. B29C 59/00; B29C 67/24; B29C 37/02; B27N 3/08
(52) U.S. Cl. .................. 264/122; 264/118; 264/123; 264/138; 264/239
(58) Field of Search .................. 264/122, 118, 264/123, 138, 239

(56) References Cited

U.S. PATENT DOCUMENTS 4,703,533 A * 11/1987 Barma .................. 12/142 E
4,858,337 A * 8/1989 Barma .................. 36/4
5,829,171 A * 11/1998 Weber et al. .................. 36/93

* cited by examiner

Primary Examiner—Stephen J. Lechert, Jr.
(74) Attorney, Agent, or Firm—Leong C. Lei

(57) ABSTRACT

A method of fabricating shoe insole is disclosed. The method comprises mixing the material including rice husk and wheat husk about 35 to 60%, natural rubber about 25 to 45%, artificial rubber of 10 to 20%, and occupied 92% above of the insole; mixing product of (a) with an appropriate amount of additive including rubber curing additive and activitized promoter for less than 8%; treating the product of (b) to form plate-like structure as environment friendly material plate; and molding and fixing at elevated temperature to form an insole.

4 Claims, 1 Drawing Sheet

METHOD OF FABRICATING SHOE INSOLES

BACKGROUND OF THE INVENTION (a) Field of the Invention

The present invention relates to shoe insole, and in particular, to a method of fabricating insole using environmental-friendly raw materials such as rice husk wheat husk or the like.

(b) Description of the Prior Art

Various types of shoe insoles are available in the market, some of which are intended to last for a couple of years and others may be intended to be replaced anytime. Those insoles, which are intended to last for an extended period of time, are generally made of foams or plastics or the like materials. During the application time of these types of insoles, the insoles may be deteriorated and lose some of their properties, for instance the cushioning effect or hygienically effect. Also, since they are exposed over a relatively long period of time to the moisture and odor of the foot, the shoe in which they are used can tend to retain the wetness and odor. Another disadvantage with these types of shoe insoles is that they are relatively expensive due to their construction. A further disadvantage is that the insole when replaced is unfriendly to the environment.

Another type of shoe insole is that which is intended to be changed daily. These types of insoles are relatively less expensive than the above-described insoles. However, they tend not to be as effective in controlling wetness and odor.

Other types of conventional insoles are also widely marketed nowadays. For certain problems, a standard, pre-cut insole, which can be mass-produced in various shoe sizes and fit into conventional shoes, suffices. However, individually tailored shoe inserts, which are shaped to the individual foot, are always preferable, especially in certain foot disorders. Such inserts are generally made by a process which is both laborious and time consuming. Accordingly, it is an object of the present invention to mitigate the above drawbacks by providing a new and novel method of fabricate insole.

SUMMARY OF THE INVENTION

Accordingly, it is an object of the present invention to provide a method of fabricating shoe insole using environmental friendly material comprising the steps of mixing the material including rice husk and wheat husk about 35 to 60%, natural rubber about 25 to 45%, artificial rubber of 10 to 20%, and occupied 92% above of the insole; mixing product of (a) with an appropriate amount of additive including rubber curing additive and activitized promoter for less than 8%; treating the product of (b) to form plate-like structure as environmental friendly material plate; and molding and fixing at elevated temperature to form an insole.

Yet another object of the present invention is to provide a method of fabricating shoe insole, wherein the method is cost saving, and the insole is durable for a long period of time.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
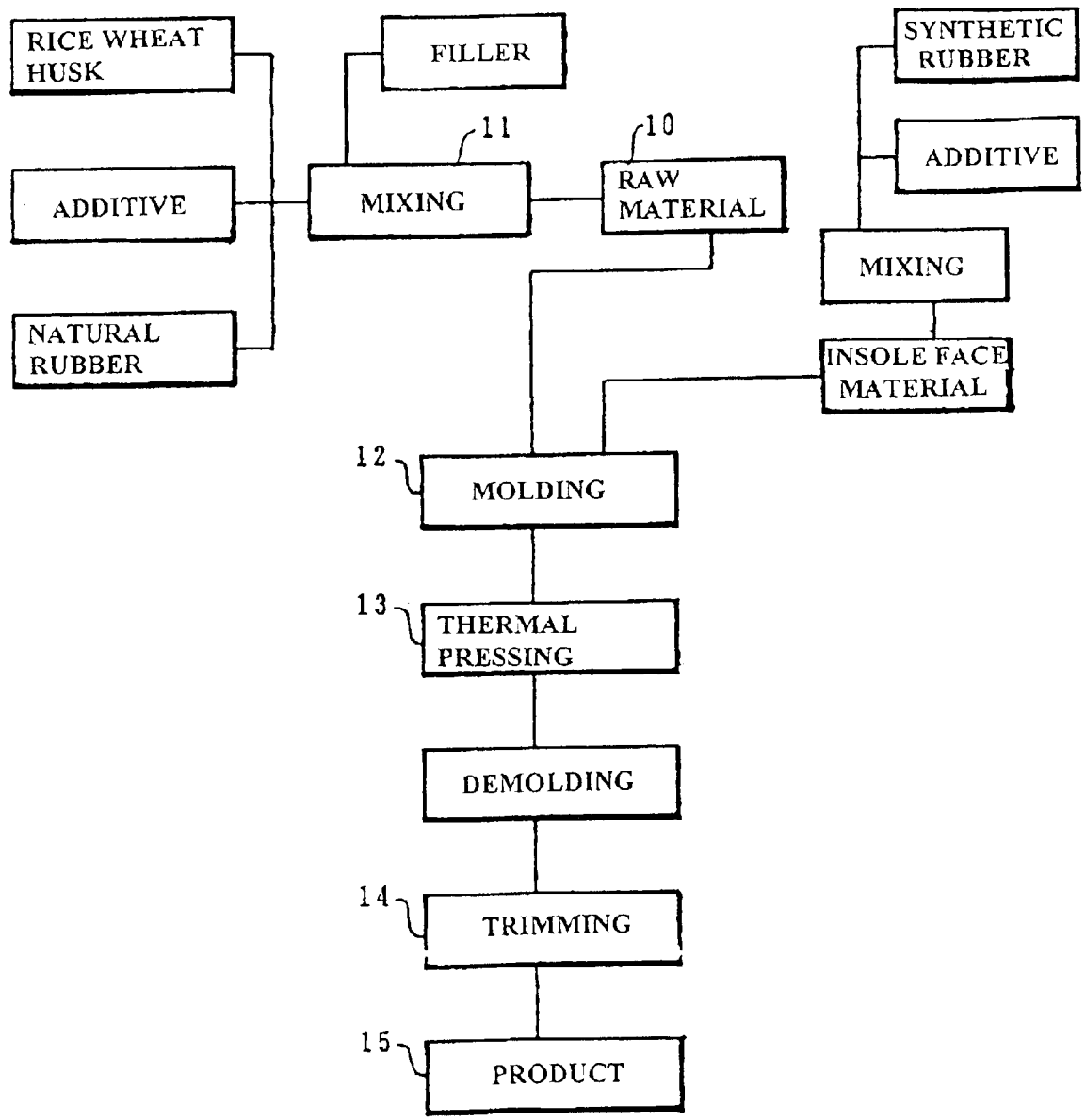
FIG. 1 is a flowchart showing the method of fabricating an environmental friendly insole in accordance with the present invention.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIG. 1, there is shown a flow chart showing the fabrication of insole using vegetative fibrous material, such as rice husk, wheat husk, without special pre-treatment and the material is then mixed with natural rubber or synthetic rubber in the mixing step 11 to form raw material 10. The fibrous material is about 35 to 60%, the natural rubber is 25 to 45% and the synthetic rubber is 10 to 25%. These materials are mixed and stirred to form the essential material. A forming additive is added to the raw material 10 and is then mixed at the mixing step 11 and is then pressed to form a plate-like material or to form into a bundle of the raw material 10, facilitating fabrication process. The thickness is about 1 to 50 mm. The raw material 10 is about 92% of the material forming the insole. The remaining material includes sulfur of rubber curing promoter, and the percentage is about 8%. The material is directly added to the raw material and is then undergone the mixing step 11.

An appropriate amount of the raw material 10 is placed into a mold 12 and is then followed by a thermal pressing step 13. Due to the addition of the promoter, the flowability of the raw material is improved and the raw material occupies the entire cavity of the mold 12.

The temperature for the thermal and pressing step 13 is about 100 to 160° C. and the time for this step is about 4 to 15 minutes. The components of the raw material can be appropriately adjusted. The semi-product obtained is undergone a trimming step 14 and thus a product 15 of an insole is obtained.

In accordance with the present invention, the raw material 10 can be added with 5 to 10% of appropriate filler, such as kaolin, calcium carbonate, glass powder aluminum oxide. The insole material 10 has a thickness of 1 to 10 mm.

The following experiment has been carried out by Taiwan Footwear Research Institute:

| ITEM | RESULT | CONDITION AND METHOD |
|---|---|---|
| FLEXING TEST | 0–20000 CYCLES: NON-BROKEN | FLEX ANGLE: 90 DEGREES ANGLE |

-continued

| ITEM | RESULT | CONDITION AND METHOD |
|------|--------|---------------------|
| (FREEZING) | 20001–40000 CYCLES: NON-BROKEN | TEMP. −20 + 1° C. |
| P.S. | RESULT JUST AS THE TESTED SAMPLE | |

It will be understood that each of the elements described above, or two or more together may also find a useful application in other types of methods differing from the type described above.

While certain novel features of his invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A method of fabricating shoe insole using environmental friendly material comprising the steps of:

(a) mixing the material including rice husk and wheat husk about 35 to 60%, natural rubber about 25 to 45%, artificial rubber of 10 to 20%, and occupied 92% above of the insole;

(b) mixing product of (a) with an appropriate amount of additive including rubber curing additive and activitized promoter for less than 8%;

(c) treating the product of (b) to form plate-like structure as environmental friendly material plate; and (d) molding and fixing at elevated temperature to form an insole.

2. The method of claim 1, wherein the thickness of the plate-like raw material is between 1–50 mm.

3. The method of claim 1, wherein kaolin, calcium carbonate, glass powder and aluminum oxide or filler is added to harden the insole.

4. The method of claim 1, wherein the percentage of the filler is about 5 to 10% of the mixed material, which is used to replace the rice and wheat, husk in proportion.

* * * * *